United States Patent
Zhu et al.

(10) Patent No.: US 12,214,318 B2
(45) Date of Patent: Feb. 4, 2025

(54) MOLECULARLY-MIXED COMPOSITE MEMBRANES AND METHODS FOR MAKING THE SAME

(71) Applicant: Georgia Tech Research Corporation, Atlanta, GA (US)

(72) Inventors: Guanghui Zhu, Atlanta, GA (US); Ryan P. Lively, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 933 days.

(21) Appl. No.: 16/971,353

(22) PCT Filed: Feb. 20, 2019

(86) PCT No.: PCT/US2019/018779
§ 371 (c)(1),
(2) Date: Aug. 20, 2020

(87) PCT Pub. No.: WO2019/164954
PCT Pub. Date: Aug. 29, 2019

(65) Prior Publication Data
US 2020/0391162 A1    Dec. 17, 2020

Related U.S. Application Data

(60) Provisional application No. 62/632,530, filed on Feb. 20, 2018.

(51) Int. Cl.
*B01D 69/12* (2006.01)
*B01D 67/00* (2006.01)
(Continued)

(52) U.S. Cl.
CPC .......... *B01D 69/12* (2013.01); *B01D 67/0011* (2013.01); *B01D 67/0013* (2013.01);
(Continued)

(58) Field of Classification Search
CPC ............ B01D 69/12; B01D 67/0011; B01D 67/0013; B01D 69/02; B01D 71/64;
(Continued)

(56) References Cited

U.S. PATENT DOCUMENTS 4,728,346 A * 3/1988 Murphy ............. B01D 67/0088
96/13
11,717,803 B2 * 8/2023 Cooper ............. B01J 20/28057
423/245.1
(Continued)

FOREIGN PATENT DOCUMENTS

CN    102421831 A  *  4/2012 ............. B01D 65/10
CN    112390803 A  *  2/2021 ............. B01D 53/02
(Continued)

OTHER PUBLICATIONS

Bushell et al. "Nanoporous Organic Polymer/Cage Composite Membranes" Angewandte Chemie International Edition, vol. 52, Issue 4 pp. 1057-1332 published Jan. 2013 (Year: 2013).*
(Continued)

*Primary Examiner* — Stephen Hobson
(74) *Attorney, Agent, or Firm* — Troutman Pepper Hamilton Sanders LLP; Ryan A. Schneider; Chris N. Davis

(57) ABSTRACT

Disclosed herein is a molecularly-mixed composite membrane comprising an amorphous scrambled porous organic compound (ASPOC) material and a polymer. With current developments in membrane technologies, there exists a need for largely scalable membranes and improved performance with difficult molecular separations. Mixed Matrix Membranes improve separation performance to a degree, but also increase the membrane defects as the filler material aggregates into particles that disrupt the membrane matrix. The disclosed membrane is configured to reduce defects and increase homogeneity. The disclosed ASPOC material
(Continued)

avoids aggregation and disperses uniformly in the polymer matrix, creating a molecularly-mixed composite membrane with improved separation performance. Also disclosed herein are methods for making the same.

23 Claims, 9 Drawing Sheets

(51) Int. Cl.
  *B01D 69/02* (2006.01)
  *B01D 69/14* (2006.01)
(52) U.S. Cl.
  CPC .......... *B01D 69/02* (2013.01); *B01D 69/1411* (2022.08); *B01D 2323/50* (2013.01); *B01D 2325/20* (2013.01)
(58) Field of Classification Search
  CPC ............ B01D 2323/50; B01D 2325/02; B01D 2325/20; B01D 53/228; B01D 2257/102; B01D 2257/504; B01D 2257/7025; B01D 69/141; B01D 71/60; Y02C 20/20
  See application file for complete search history.

(56) References Cited

U.S. PATENT DOCUMENTS

| | | | | |
|---|---|---|---|---|
| 2008/0286472 A1* | 11/2008 | Tutin | ................ | C08L 61/00 427/350 |
| 2009/0000474 A1* | 1/2009 | MacGillivray | ....... | F17C 11/007 95/90 |
| 2010/0162887 A1* | 7/2010 | Hagg | ................... | C04B 35/524 95/55 |
| 2013/0001153 A1* | 1/2013 | Na | ..................... | C08L 83/10 210/488 |
| 2013/0047846 A1* | 2/2013 | Ma | ..................... | B03C 3/70 96/99 |
| 2013/0047849 A1* | 2/2013 | Zhang | ................... | B82Y 30/00 564/337 |
| 2015/0231572 A1* | 8/2015 | Vankelecom | ...... | B01D 67/0011 427/337 |
| 2015/0364720 A1* | 12/2015 | Itoh | ................ | C23C 16/545 428/446 |
| 2017/0136419 A1* | 5/2017 | Getpreecharsawas | ....................... | B01D 69/10 |
| 2018/0297009 A1* | 10/2018 | Cooper | ................ | C07D 487/22 |
| 2020/0391162 A1* | 12/2020 | Zhu | ................ | B01D 69/02 |

FOREIGN PATENT DOCUMENTS

| | | | | |
|---|---|---|---|---|
| CN | 112473404 A | * | 3/2021 | ........... B01D 53/228 |
| WO | 2005039642 | | 5/2005 | |
| WO | WO-2015011654 A1 | * | 1/2015 | ............. B01D 53/02 |
| WO | WO-2016196814 A1 | * | 12/2016 | ........... B01D 61/025 |
| WO | WO-2016201222 A1 | * | 12/2016 | ........... B01D 53/228 |
| WO | WO-2019164954 A1 | * | 8/2019 | ......... B01D 67/0011 |

OTHER PUBLICATIONS

Evans et al. "Molecular Design of Amorphous Porous Organic Cages for Enhanced Gas Storage" The Journal of Physical Chemistry vol. 119 pp. 7746-7754 published Mar. 4, 2015 (Year: 2015).*
Search Report from Application No. PCT/US2019/018779 dated May 8, 2019 (12 pages).
Jiang, et al., "Functional Porous Composites by Blending the Solution-Processable Molecular Pores," Chemical Communications 2016 vol. 52(42), pp. 6896-6898.
Kong, et al., "Amorphous Porous Organic Cabe Membranes for Water Desalination," The Journal of Physical Chemistry, Jan. 17, 2018, vol. 122(3), p. 1738.
Giri, et al., "Liquids with Permanent Porosity," Nature Nov. 12, 2015, vol. 527(7577) p. 219.
Tananuwong, et al., "Differential Scanning Calorimetry Study of Glass Transition in Frozen Starch Gels," Journal of Agricultural and Food Chemistry Jun. 20, 2004 vol. 52(13) p. 4315.
Hasell, et al., "Reversible Water Uptake by a Stable Imine-Based Porous Organic Cage," Chemical Communications 2012 vol. 48(39) p. 4690.
Koljenovic, et al., "Raman Microspectroscopic Mapping Studies of Human Bronchial Tissue," Journal of Biomedical Optics Nov. 2004 vol. 9(6) pp. 1189-1191.

* cited by examiner

MOLECULARLY-MIXED COMPOSITE MEMBRANES AND METHODS FOR MAKING THE SAME

CROSS-REFERENCE TO RELATED APPLICATIONS

This application claims the benefit, under 35 U.S.C. § 119(e), of U.S. Provisional Patent Application No. 62/632,530, filed 20 Feb. 2018, the entire contents and substance of which is incorporated herein by reference in its entirety as if fully set forth below.

STATEMENT OF RIGHTS UNDER FEDERALLY SPONSORED RESEARCH

This invention was made with government support under Award No. DE-SC0012577 awarded by the U.S. Department of Energy. The government has certain rights in the invention.

FIELD OF THE DISCLOSURE

The present disclosure relates generally to membranes and methods of improving the same. Particularly, embodiments of the present disclosure relate to molecularly-mixed composite membranes.

BACKGROUND

Membrane separations are promising alternatives for thermally-driven industrial separation processes. Despite being eminently scalable, existing and emerging membranes suffer a tradeoff between permeability and selectivity, which are two of the defining performance metrics for membranes. Inorganic membranes such as zeolites and metal organic frameworks (MOFs) have overcome this tradeoff and surpassed traditional membrane performance in separating challenging molecular pairs. However, the preparation of large-scale defect-free inorganic membranes remains a challenge. Mixed Matrix Membranes (MMMs) incorporate filler materials with a polymer to boost membrane performance while retaining the intrinsic scalability of polymer processing. A longstanding issue in MMM formation, however, is the propensity for the formation of defect pathways caused by aggregation of the filler material to form particles and disrupt the continuous polymer matrix. Improved membranes to achieve molecular mixing with no defect formations between matrix and filler particle phases are desirable.

What is needed, therefore, is a membrane with the scalability and processability of a MMM, improved separation performance in challenging molecular pairs, and the ability to produce defect-free molecularly-mixed composite membranes. Embodiments of the present disclosure address this need as well as other needs that will become apparent upon reading the description below in conjunction with the drawings.

BRIEF SUMMARY OF THE INVENTION

The present invention relates to molecularly-mixed composite membranes and methods for making the same. An exemplary embodiment of the present invention provides a molecularly-mixed composite membrane, comprising an amorphous scrambled porous organic cage (ASPOC) material and a polymer.

In any of the embodiments described herein, the ASPOC material can comprise an ASPOC material with weak cage-cage interactions.

In any of the embodiments described herein, the ASPOC material can comprise an ASPOC material with stronger polymer-cage interactions than cage-cage interactions.

In any of the embodiments described herein, a glass transition onset temperature of the membrane can be greater than a glass transition onset temperature of the polymer.

In any of the embodiments described herein, a glass transition midpoint temperature of the membrane can be greater than a glass transition midpoint temperature of the polymer.

In any of the embodiments described herein, a swelling volume of the membrane can be less than a swelling volume of the polymer.

In any of the embodiments described herein, the membrane can present a diffusion coefficient greater than a diffusion coefficient of the polymer.

In any of the embodiments described herein, the membrane can present a carbon dioxide permeability of 20 barrer or greater.

In any of the embodiments described herein, the membrane can present a methane permeability of 0.75 barrer or greater.

In any of the embodiments described herein, the membrane can present a nitrogen permeability of 1 barrer or greater.

In any of the embodiments described herein, the membrane can present a $SF_6$ permeability of 0.01 barrer or greater.

In any of the embodiments described herein, the ASPOC material can comprise a material with individual organic cages.

In any of the embodiments described herein, the ASPOC material can be homogeneously distributed in the polymer, such that the membrane presents a Raman mapping comprising an 8-bit color depth of from 104 to 116 for a 3000-square micron area of the membrane.

In any of the embodiments described herein, the ASPOC material can be homogeneously distributed in the polymer, such that the membrane presents a Raman mapping comprising an 8-bit color depth of 143 or less for a 3000-square micron area of the membrane.

In any of the embodiments described herein, the ASPOC material can be present in an amount of 20% or less by weight, based on total weight of the membrane.

In any of the embodiments described herein, the ASPOC material can be present in an amount of 10% or less by weight, based on total weight of the membrane.

In any of the embodiments described herein, the ASPOC material and the polymer can form a single-phase material.

In any of the embodiments described herein, the ASPOC material can comprise a plurality of microporous molecules.

In any of the embodiments described herein, the ASPOC material can be an anti-plasticizer in the membrane.

Another embodiment of the present inventions provides a method of making a molecularly-mixed composite membrane, the method comprising: providing a dope solution comprising a polymer, an amorphous scrambled porous organic cage (ASPOC) material, and a first solvent, mixing the dope solution, and casting the mixed dope solution.

In any of the embodiments described herein, the mixing can comprise sonication.

In any of the embodiments described herein, the sonication can occur for 1 minute or less.

In any of the embodiments described herein, the casting can comprise spin-coating the solution on pre-formed cross-linked polyimide supports.

In any of the embodiments described herein, the casting can comprise casting a standalone membrane.

In any of the embodiments described herein, the casting can further comprise annealing the casted membrane under vacuum.

In any of the embodiments described herein, the mixed dope solution can be homogeneous.

In any of the embodiments described herein, the method can further comprise synthesizing the ASPOC material.

In any of the embodiments described herein, the synthesizing can further comprise: providing a second solution, comprising an aldehyde material, at least one diamine material, and a second solvent, mixing, at room temperature, the solution, and evaporating at least a portion of the second solvent.

In any of the embodiments described herein, the evaporating the at least a portion of the second solvent can further comprise drying, under vacuum, the ASPOC.

In any of the embodiments described herein, the method can further comprise washing the ASPOC material with a nonsolvent.

In any of the embodiments described herein, the method can further comprise, after the casting, evaporating at least a portion of the first solvent to form a membrane.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
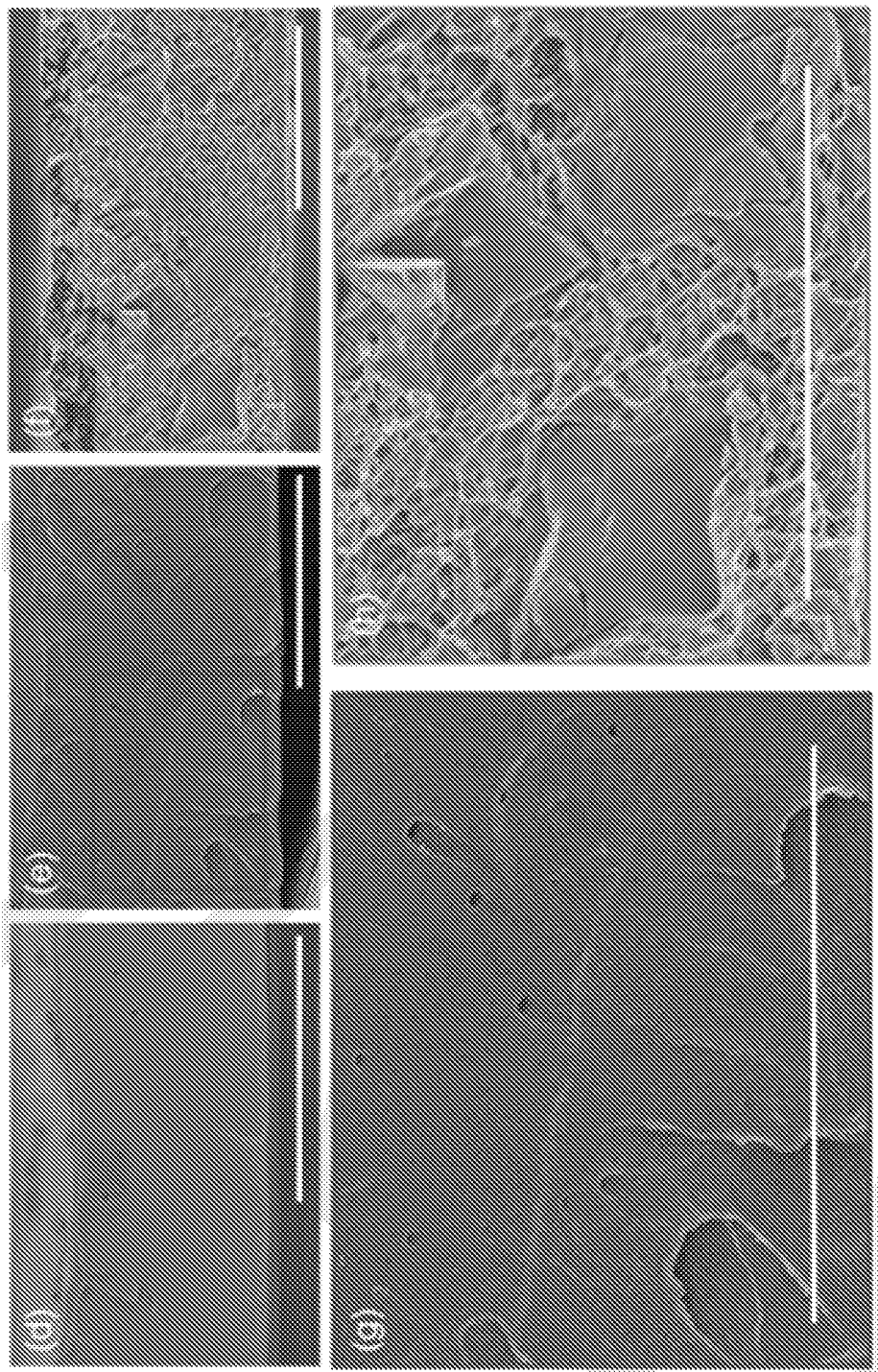
FIG. 1 shows a series of Scanning Electron Microscope (SEM) images of a molecularly-mixed composite membrane compared to a nonhomogeneous membrane.
Figure 2:
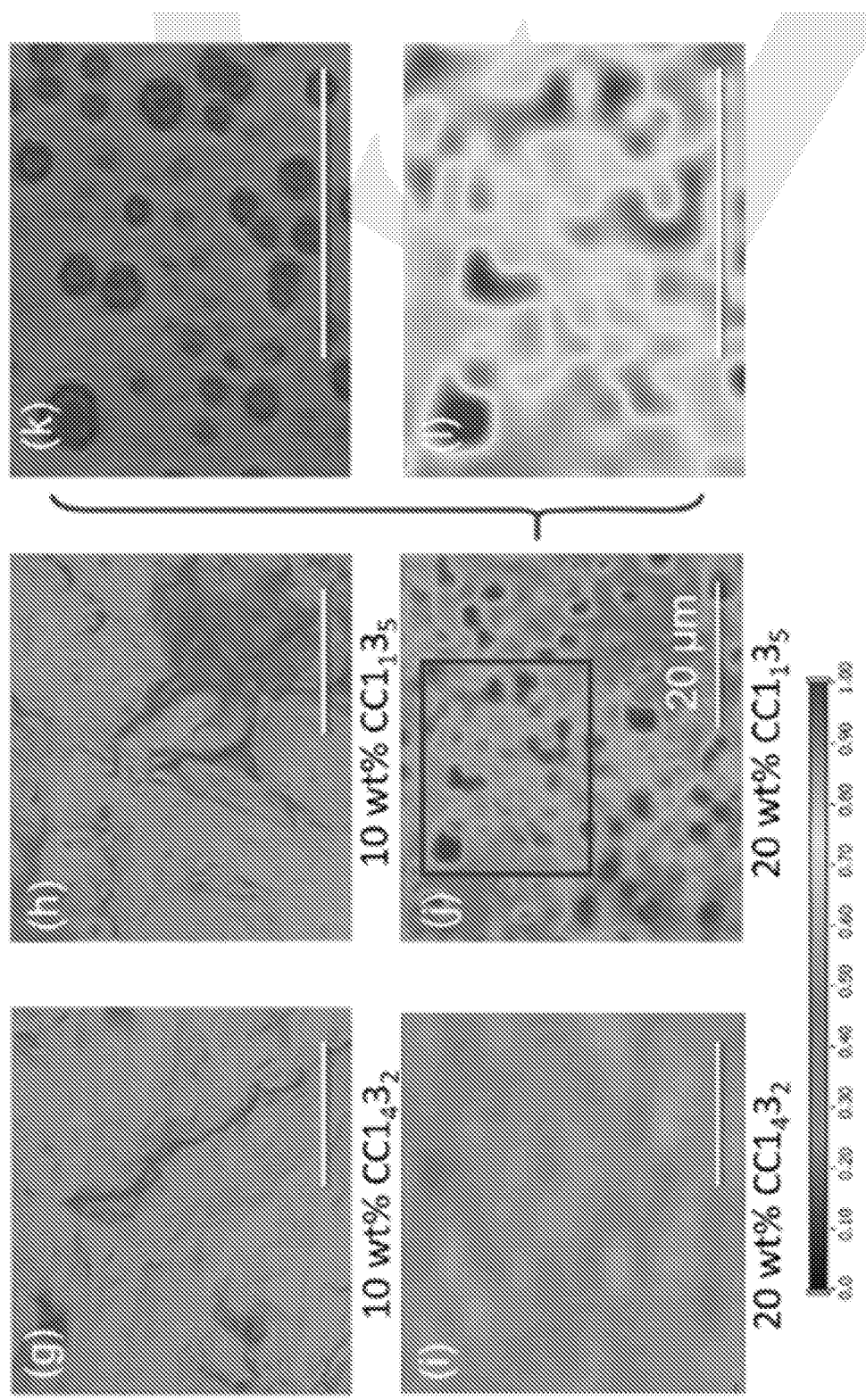
FIG. 2 shows a Raman map of some embodiments of a molecularly-mixed composite membrane.
Figure 3A:
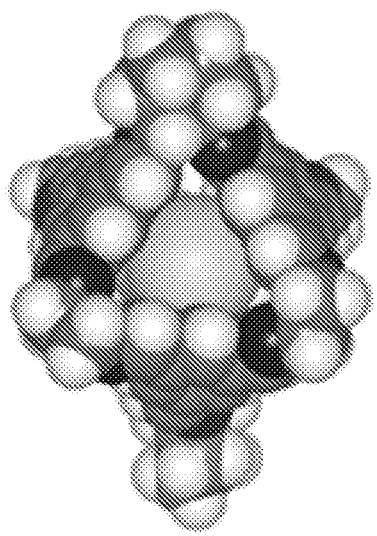
FIGS. 3A-3B illustrate a rendering of a structure an exemplary embodiment of an amorphous scrambled porous organic cage (ASPOC) molecule compared with common gas molecules.
Figure 3B:
Figure 4:
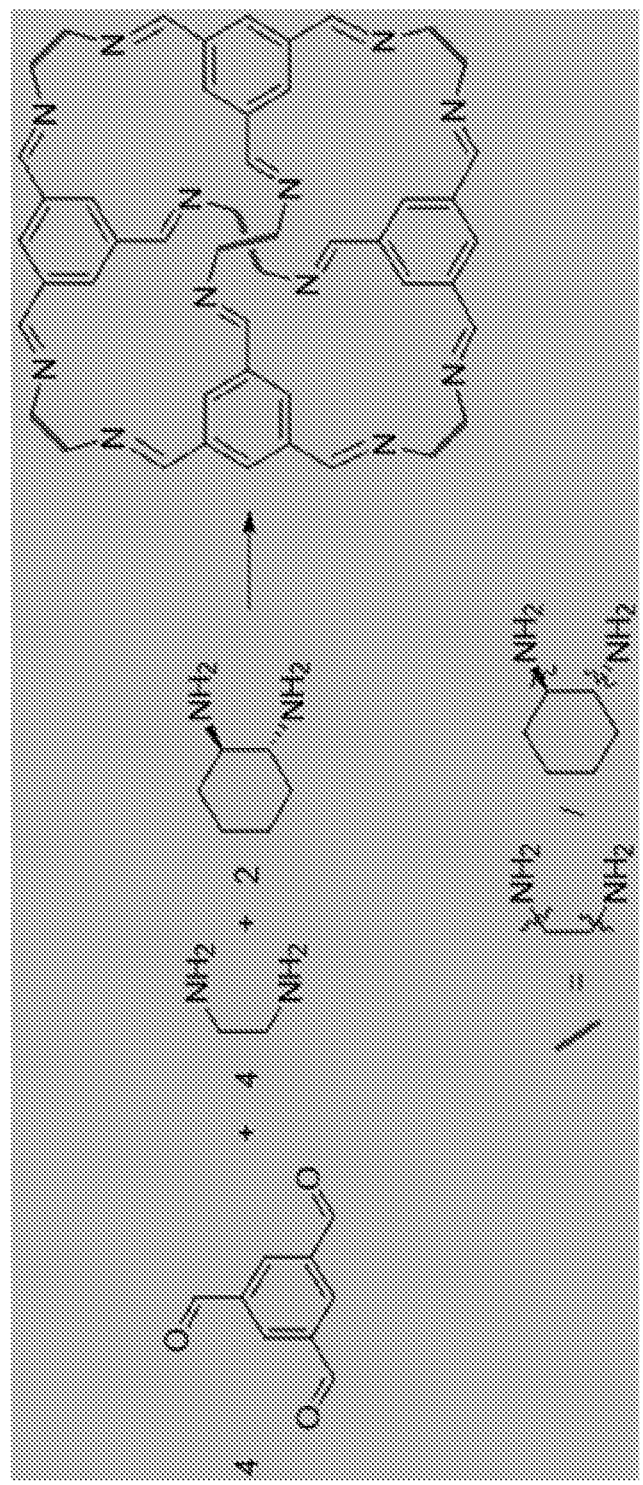
FIG. 4 illustrates another embodiment of a structure of an amorphous scrambled porous organic cage (ASPOC) molecule and method of making the same.
Figure 5:
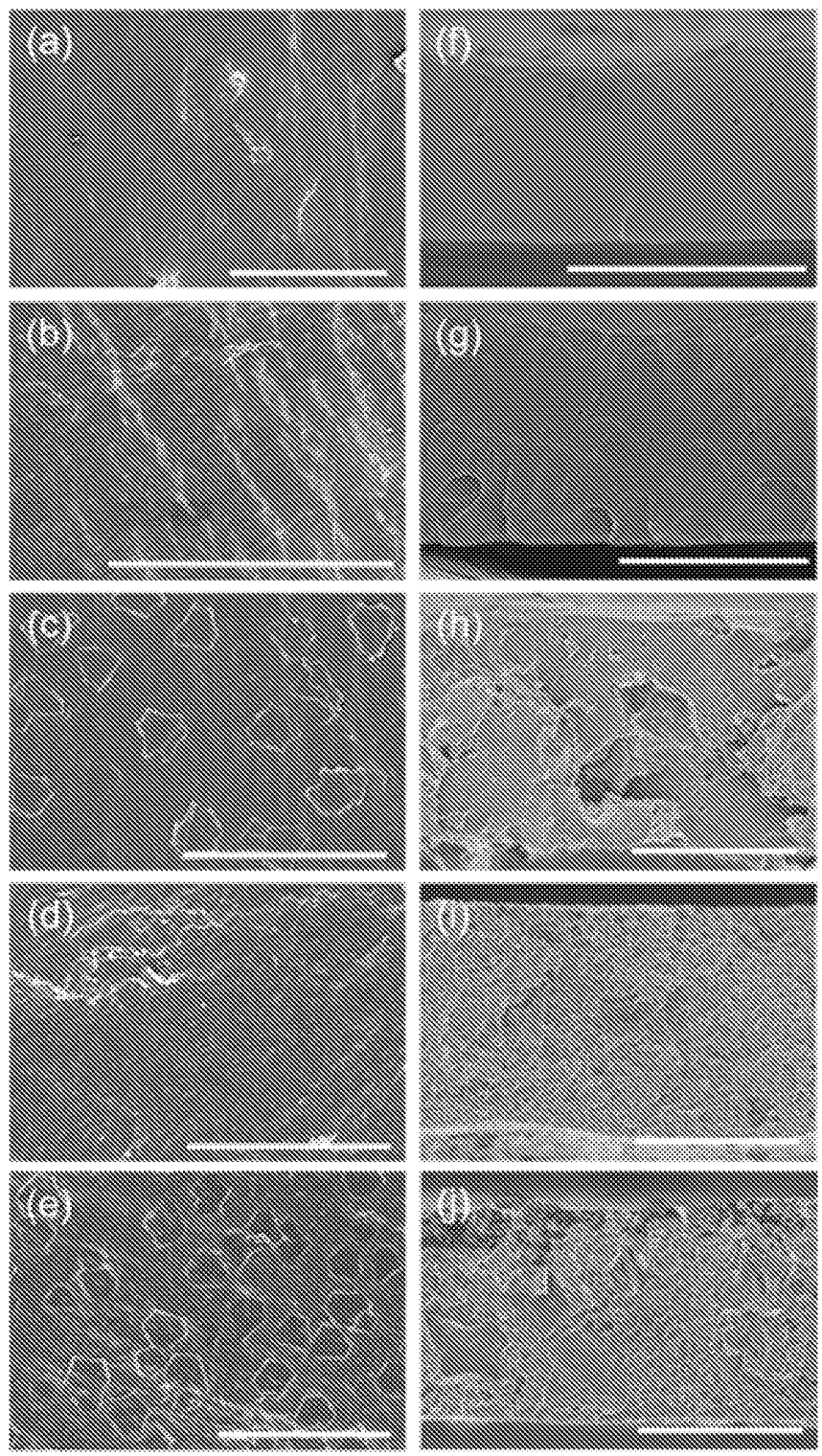
FIG. 5 shows a series of Scanning Electron Microscope (SEM) images of a molecularly-mixed composite membrane compared to a nonhomogeneous membrane.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As described above, a problem with current membranes is the tradeoff between permeability and selectivity making membranes difficult to scale up for industrial use. While certain improved membranes exist, such as zeolites, Mixed Matrix Membranes (MMMs), and Molecular Organic Frameworks (MOFs), these membranes are limited in their performance and scalability due to the difficulty of forming defect-free membranes. In the case of MMMs, the defects in the membranes are caused by the aggregation of the filler material into large particles. Such large particles disrupt the packing of the polymer membrane matrix and create defect pathways that reduce membrane performance. The potential of membrane technologies to surpass traditional thermally-intensive processes has created an important technological field with potential for advancement. These membranes have potential to be used in many industries, such was hydrocarbon processing, wastewater treatment, bioprocessing, biofuels, carbon capture, gas scrubbing, consumer filtration, and many of the like. Developing improved membranes able to surpass traditional membrane performance with increased ease of defect-free production would greatly extend the design space and industrial capabilities of membrane separation technologies.

Disclosed herein is a molecularly-mixed composite membrane. Membrane technologies turn polymer-based solutions into membranes in many forms, such as thin film or hollow fiber. Membranes with a high degree of homogeneity are desired for their defect-free nature, however increased performance is still desired. Attention is turned to Porous Organic Cages (POCs), large anti-plasticizing molecules porous enough to allow permeation of certain gases. While POCs increased permeance of polymeric membranes, the addition and aggregation of POCs created defects in the membranes. A subset of POCs, Amorphous Scrambled Porous Organic Cages (ASPOCs), were studied due to their decreased inter-cage interactions. In the polymer-ASPOC solutions made to fabricate the disclosed membranes, polymer-cage interactions and cage-cage interactions compete to influence the microstructure of the resulting membranes. As such, a desired molecularly-mixed composite membrane would contain ASPOCs with weak cage-cage interactions and polymer-cage interactions substantial stronger than the cage-cage interactions. Polymeric membranes formed with the addition of ASPOCs were created with a high level of homogeneity were found to greatly reduce the defects caused by particle aggregation. Polymeric membranes were found to be able to undergo moderate ASPOC loading levels based on weight percentage while still retaining a high degree of homogeneity. Additionally, the molecularly-mixed composite membranes fabricated with ASPOCs are desirable for their improved performance in certain properties as well as their anti-plasticizing nature. Certain properties can include, but are not limited to, glass transition temperature, permeability, selectivity, volume swelling, and diffusion coefficient. Levels of homogeneity in the membrane can be measured using techniques well-known in the art, such as x-ray diffraction and Raman mapping, among others. Also disclosed herein are methods for making molecularly-mixed composite membranes.

Disclosed herein are molecularly-mixed composite membranes comprising a porous molecular material and a polymer. Suitable examples of a porous molecular material can include, but are not limited to, zeolites, metal organic frameworks (MOFs), porous organic cages (POCs), amorphous scrambled porous organic cages (ASPOCs), a combination thereof, or any organic framework or cage-forming compound. In some embodiments, the porous molecular material can be any material that would provide porous molecular cages. Such a material, such as POCs, consist of individual molecules containing a single nano-porous cavity. A drawback with POCs, however, is the propensity for the POC molecules to crystallize into particles that disrupt the membrane. In some embodiments, the porous molecular material can comprise an ASPOC material and be selected such that the cage-cage interactions of the ASPOC are weaker than the polymer-cage interactions. Suitable examples of an ASPOC are known in the art, including but not limited to, CC3-R, CC1-R, $CC1_35_5$, $CC1_43_2$, any ASPOC of the general form CC1x3y, or a combination thereof. Methods for synthesizing the ASPOC material are known in the art, and in some embodiments, the ASPOC material can be synthesized according to the methods of Jiang et al. (Jiang, S., Jones, J. T. A., Hassell, T., Blythe, C. E., Adams, D. J., Trewin, A., Cooper, A. I., *Nat. Commun.* 2011, 2, 207). The decreased cage-cage interactions reduce and nearly eliminate the propensity of the cages to aggregate into particles and can also increase the solubility of the ASPOC material in certain solvents. As would be appreciated by one of ordinary skill in the art, such an embodiment would greatly simplify the process for solution-based manufacturing. Furthermore, the addition of the ASPOC material which comprises sterically large molecular cages has the same effect as adding an anti-plasticizer material. Typical anti-plasticizers comprise sterically large solvent-like molecules which hinder the movement of polymer chains in the bulk material. The ASPOC material also comprises sterically large solvent-like molecules to achieve the same hinderance of the polymer chains, but the ASPOC material molecules further comprise porous cages. The addition of the ASPOC material, therefore, would achieve the same anti-plasticization effects while also increasing porosity properties, such as diffusion coefficient. As would be appreciated by one of ordinary skill in the art, such an embodiment would provide for improved membrane separation capabilities.

The polymer in the disclosed embodiments can be any functional polymer desired for separation purposes. Suitable examples of a polymer can include, but are not limited to, biopolymers, inorganic polymers, organic polymers, conductive polymers, copolymers, fluoropolymers, polyterpenes, phenolic resins, polyanhydrides, polyketones, polyesters, polyimides (such as Matrimid 5218 or 6FDA-DAM), polyolefins, rubbers, silicones, silicone rubbers, superabsorbent polymers, synthetic rubbers, vinyl polymers, or a combination thereof. Other suitable examples of the polymer can include, but are not limited to, polyester resin, polyurethanes, polyurea, vulcanized rubber, bakelite, duroplast, urea formaldehyde, melamine resin, diallyl phthalate, epoxy resin, benzoxazines, polyimides, bismaleimides, cyanate esters, furan resins, silicone resins, thiolyte, vinyl ester, acrylic, polymethyl methacrylate, acrylonitrile butadiene styrene, chlorinated polyvinyl chloride, nylon, polylactic acid, polybenzimidazole, polycarbonate, polyether sulfone, polyoxymethylene, polyether ether ketone, polyethylene, polyphenylene sulfide, polypropylene, polystyrene, polyvinyl chloride, polyvinylidene fluoride, polytetrafluoroethylene, polyisoprene, polybutadiene, chloroprene, butyl rubber, halogenated butyl rubber, styrene butadiene, nitrile rubber, halogenated nitrile rubber, ethylene propylene rubber, ethylene propylene diene rubber, epichlorohydrin rubber, polyacrylic rubber, silicone rubber, fluorosilicone, fluoroelastomers, perfluoroelastomers, polyether block amides, chlorosulfonated polyethylene, ethylene vinyl acetate, thermoplastic elastomers, polysulfide rubber, cellulose acetate (CA), polymer of intrinsic micro porosity 1 (PIM-1), or a combination thereof. Additional examples of suitable polymers useable include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; polyethersulfones; poly(arylene oxides) such as poly(phenylene oxide) and poly(xylene oxide); poly(esteramide-diisocyanate); polyurethanes; polyesters (including polyarylates), such as polyethylene terephthalate, poly(alkyl methacrylates), poly(acrylates), poly (phenylene terephthalate), etc.; polypyrrolones; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly (vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines; etc., and interpolymers and the like. The polymer can also be characterized by any number of common properties. Examples of such properties can include, but are not limited to, glass transition temperature, swelling volume, diffusion coefficient, sorption coefficient, tacticity, crystallinity, tensile strength, as well as other properties known in the art.

In some embodiments, the polymer and the porous molecular material can be present in any suitable amount to confer a desirable property to the membrane. In some embodiments, the membrane can comprise an ASPOC material and a polymer. In some embodiments, the ASPOC material can be present in the membrane in an amount of 20% or less (e.g., 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less) by weight, based on total weight of the membrane. In some embodiments, the ASPOC material can be present in the membrane in an amount of 1% or greater (e.g., 2% or greater, 3% or greater, 4% or greater 5% or greater, 6% or greater, 7% or greater, 8% or greater, 9% or greater, 10% or greater, 11% or greater, 12% or greater, 13% or greater, 14% or greater, 15% or greater, 16% or greater, 17% or greater, 18% or greater, 19% or greater, or 20% or greater), but less than 100%, by weight, based on total weight of the membrane. In some embodiments, the ASPOC material can be present in the membrane in an amount of from 1% to 20% (e.g., from 1% to 5%, from 5% to 10%, from 10% to 15%, from 15% to 20%, from 5% to 20%, from 5% to 15%, or from 10% to 20%) by weight, based on total weight of the membrane.

In some embodiments, the ASPOC material can be present in any amount such that the glass transition onset temperature of the membrane is greater than the glass transition onset temperature of the pure polymer. In some embodiments, the ASPOC material can be present in any amount such that the glass transition midpoint temperature of the membrane is greater than that of the pure polymer. In some embodiments, the ASPOC material can be present in any amount such that the diffusion and sorption coefficients of the membrane are greater than that of the polymer. As would be appreciated by one of ordinary skill in the art, the change in these properties is due to the addition of the ASPOC and the sterically large molecules being homogeneously distributed in the polymer and acting as anti-plasticizers. In some embodiments, the ASPOC material can be present in any amount such that the membrane presents a carbon dioxide permeability of 20 barrer or greater (e.g., 25 barrer or greater, 30 barrer or greater, 35 barrer or greater, 40 barrer or greater, 45 barrer or greater, 50 barrer or greater, 60 barrer or greater, 70 barrer or greater, 80 barrer or greater, 90 barrer or greater, 100 barrer or greater, 200 barrer or greater, 300 barrer or greater, 400 barrer or greater, 500 barrer or greater, or 1000 barrer or greater). In some embodiments, the ASPOC material can be present in any amount such that the membrane presents a methane permeability of 1 barrer or greater (e.g., 2 barrer or greater, 3 barrer or greater, 4 barrer or greater, 5 barrer or greater, 10 barrer or greater, 15 barrer or greater, 20 barrer or greater, 25 barrer or greater, 30 barrer or greater, 35 barrer or greater, 40 barrer or greater, 45 barrer or greater, 50 barrer or greater, 60 barrer or greater, 70 barrer or greater, 80 barrer or greater, 90 barrer or greater, 100 barrer or greater, 200 barrer or greater, 300 barrer or greater, 400 barrer or greater, 500 barrer or greater, or 1000 barrer or greater). In some embodiments, the ASPOC material can be present in any amount such that the membrane presents a nitrogen permeability of 1 barrer or greater (e.g., 2 barrer or greater, 3 barrer or greater, 4 barrer or greater, 5 barrer or greater, 10 barrer or greater, 15 barrer or greater, 20 barrer or greater, 25 barrer or greater, 30 barrer or greater, 35 barrer or greater, 40 barrer or greater, 45 barrer or greater, 50 barrer or greater, 60 barrer or greater, 70 barrer or greater, 80 barrer or greater, 90 barrer or greater, 100 barrer or greater, 200 barrer or greater, 300 barrer or greater, 400 barrer or greater, 500 barrer or greater, or 1000 barrer or greater). In some embodiments, the ASPOC material can be present in any amount such that the membrane presents a sulfur hexafluoride permeability of 0.01 barrer or greater (e.g., 0.02 barrer or greater, 0.03 barrer or greater, 0.04 barrer or greater, 0.05 barrer or greater, 0.1 barrer or greater, 0.2 barrer or greater, 0.3 barrer or greater, 0.4 barrer or greater 0.5 barrer or greater, 0.6 barrer or greater, 0.7 barrer or greater, 0.8 barrer or greater, 0.9 barrer or greater, or 1 barrer or greater).

The presently disclosed membranes can present a high level of homogeneity with low degrees of crystallinity or particle aggregation. In other words, the porous molecular material can be uniformly distributed in the polymer membrane as if the solution was one continuous phase. Many techniques exist that can quantify the homogeneity of materials such as x-ray diffraction and Raman mapping. In some embodiments, the results of the Raman mapping can be organized in a histogram and analyzed to obtain an 8-bit color depth of the sample. The higher the color depth means the more artifacts appear in the Raman mapping, or, the less homogeneous the sample is. In some embodiments, the ASPOC material can be homogeneously distributed in the polymer such that the membrane presents a color depth of 150 or less (e.g., 149 or less, 148 or less, 147 or less, 146 or less, 145 or less, 144 or less, 143 or less, 142 or less, 141 or less, 140 or less, 139 or less, 138 or less, 137 or less, 136 or less, 135 or less, 134 or less, 133 or less, 132 or less, 131 or less, 130 or less, 125 or less, 120 or less, or 115 or less) based on a 3000-square micron area of the membrane. In some embodiments, the ASPOC material can be homogeneously distributed in the polymer such that the membrane presents a color depth of from 100 to 120 (e.g., from 100 to 105, from 105 to 110, from 110 to 115, from 115 to 120, from 105 to 115, from 100 to 110, or from 110 to 120) based on a 3000-square micron area of the membrane.

Also disclosed herein are methods of making a molecularly-mixed composite membrane, the method comprising: providing a dope solution comprising a polymer, an amorphous scrambled porous organic cage (ASPOC) material, and a first solvent, mixing the dope solution, and casting the mixed dope solution. For instance, the dope solution can be mixed using sonication techniques and the membrane can be casted by spin-coating the solution on pre-formed cross-linked polyimide supports. In other embodiments, the membrane can be casted as a standalone membrane. In some embodiments, the sonication can last for 60 seconds or less (e.g., 50 seconds or less, 40 seconds or less, 30 seconds or less, 20 seconds or less, 10 seconds or less, or 5 seconds or less). In some embodiments, the casted membrane can be annealed. For instance, the membrane can be placed in a vacuum oven. In some embodiments, the method can further comprise synthesizing the ASPOC material prior to forming the dope solution. This synthesizing can comprise: providing a second solution, comprising an aldehyde material, at least one diamine material, and a second solvent. The second solution can be mixed at room temperature, and at least a portion of the second solvent can be evaporated. For instance, the synthesized ASPOC material can be dried under vacuum. In some embodiments, the method can further comprise washing the ASPOC material with a nonsolvent. In some embodiments, the method can further comprise, after the casting, evaporating at least a portion of the first solvent to form a membrane.

In some embodiments, the presently disclosed method can provide an aldehyde material for use in the synthesis of an ASPOC material. For example, the aldehyde material can comprise any aromatic tetraaldehyde, any aromatic trialdehyde, any aromatic dialdehyde, any aromatic formaldehyde, any alkyl tetraaldehyde, any alkyl trialdehyde, any alkyl dialdehyde, any alkyl formaldehyde, a combination thereof, or any similar materials. In some embodiments, the aldehyde material can form the main unit of the ASPOC cage structure being linked together by a linking compound. In some embodiments, the presently disclosed method can provide at least one diamine material to act as the linking compound in the ASPOC structure. For instance, the linking compound can comprise any diamine. Other potential linking materials are considered, including, but not limited to any diamines, any triamines, any tetraamines, any dialkynes, any trialkynes, any dialkenes, any trialkenes, any thiols, any tricarboxylic acid, any dicarboxylic acid, or a combination thereof. For instance, the ASPOC material can be synthesized with triformylbenzene as the main ASPOC cage structure with ethylene diamine as the linking compound to form the ASPOC material. It is understood that that the compounds can be selected from the respective groups in certain combinations to synthesize the ASPOC material according to methods known to one of ordinary skill in the art.

In some embodiments, the presently disclosed method can provide at least one solvent. In some embodiments, the solvent compound can be any substance able to dissolve substantially dissolve the polymer and the ASPOC to create a liquid solution at room temperature and pressure. Suitable examples of a solvent can include, but are not limited to, nonpolar solvents, polar aprotic solvents, polar protic solvents, water-miscible solvents, or a combination thereof. There are many examples of appropriate solvents known to one of ordinary skill in the art, but suitable examples can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof. As would be appreciated by one of ordinary skill in the art, such an embodiment would provide a solvent compound which would be able to dissolve the polymer and the ASPOC to create a substantially homogeneous solution.

In some embodiments, the presently disclosed method can provide a nonsolvent. As used herein, the term "nonsolvent" refers to a substance which is substantially unable to dissolve the polymer and/or the ASPOC at room temperature and pressure. In some embodiments, the weight ratio of the nonsolvent compound is present in an amount such that the polymer dissolves at the additive manufacturing operating conditions in an amount of 1% or less (e.g., 0.9% or less, 0.8% or less, 0.7% or less, 0.6% or less, 0.5% or less, 0.4% or less, 0.3% or less, 0.2% or less, or 0.1% or less) by weight based on total weight of the dope to form a homogeneous solution.

Figure 6:
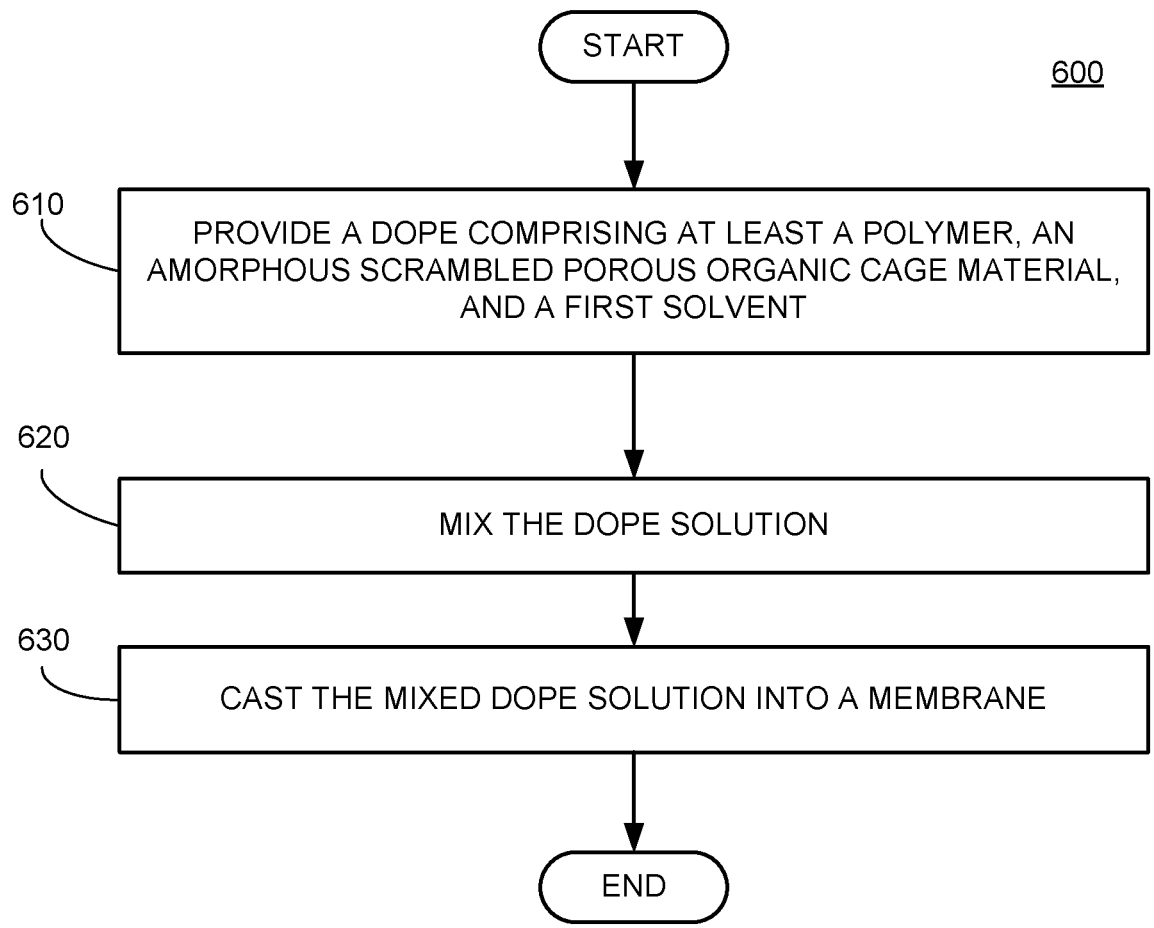
FIG. 6 is a flowchart of an exemplary method for making a molecularly-mixed composite membrane.
Figure 7:
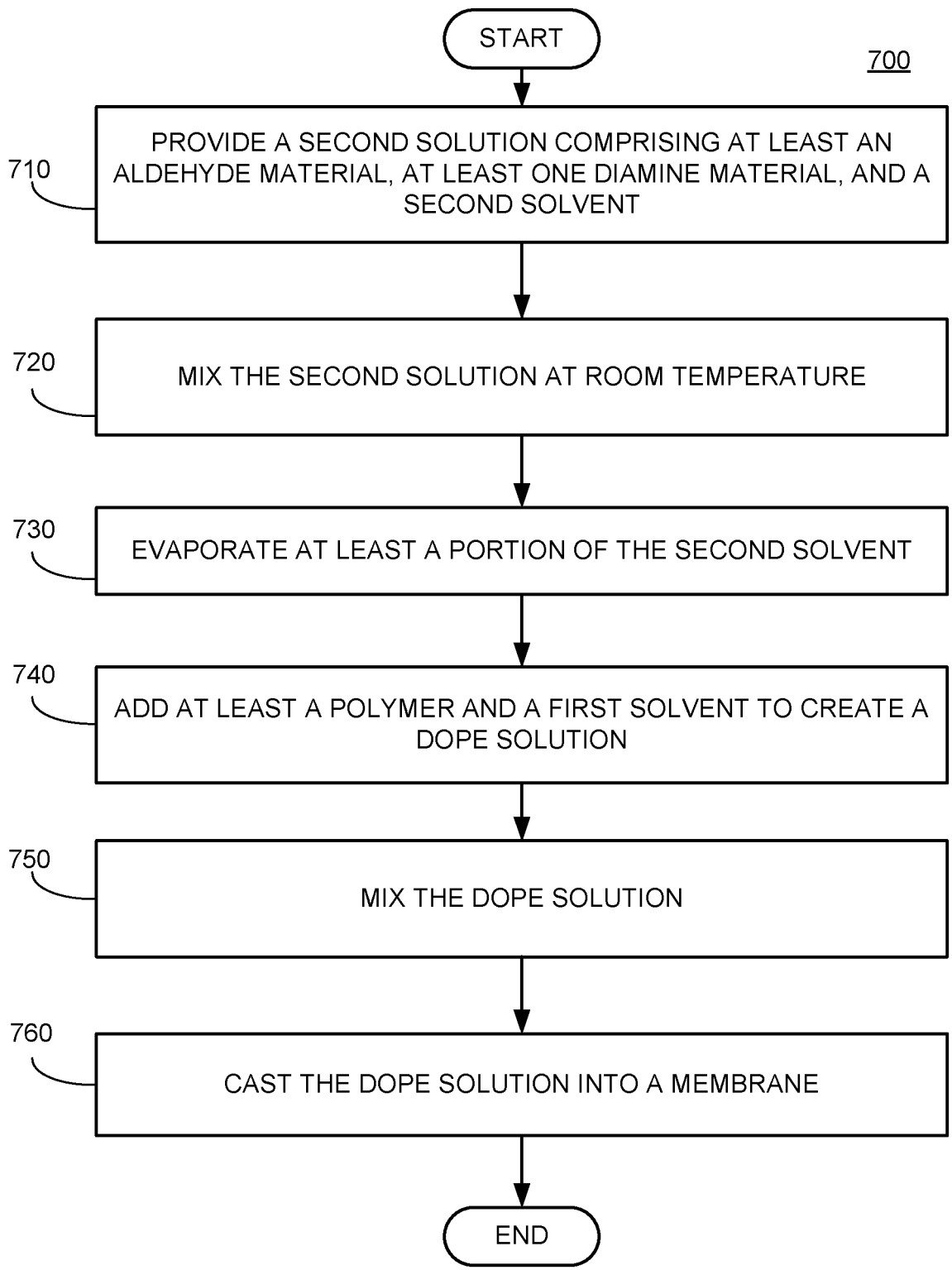
FIG. 7 is a flowchart of an exemplary method for making a molecularly-mixed composite membrane.
Figure 8:
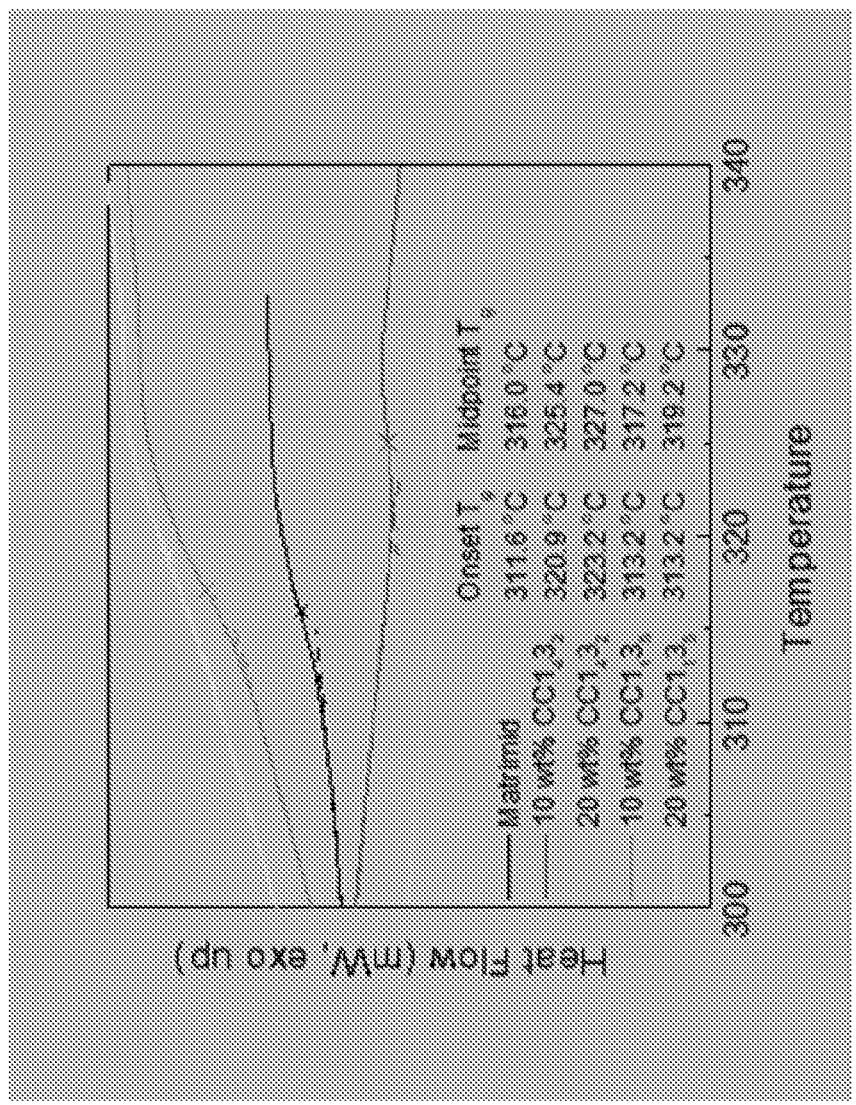
FIG. 8 illustrates the glass transition temperatures of some embodiments of the present disclosure.
Figure 9:
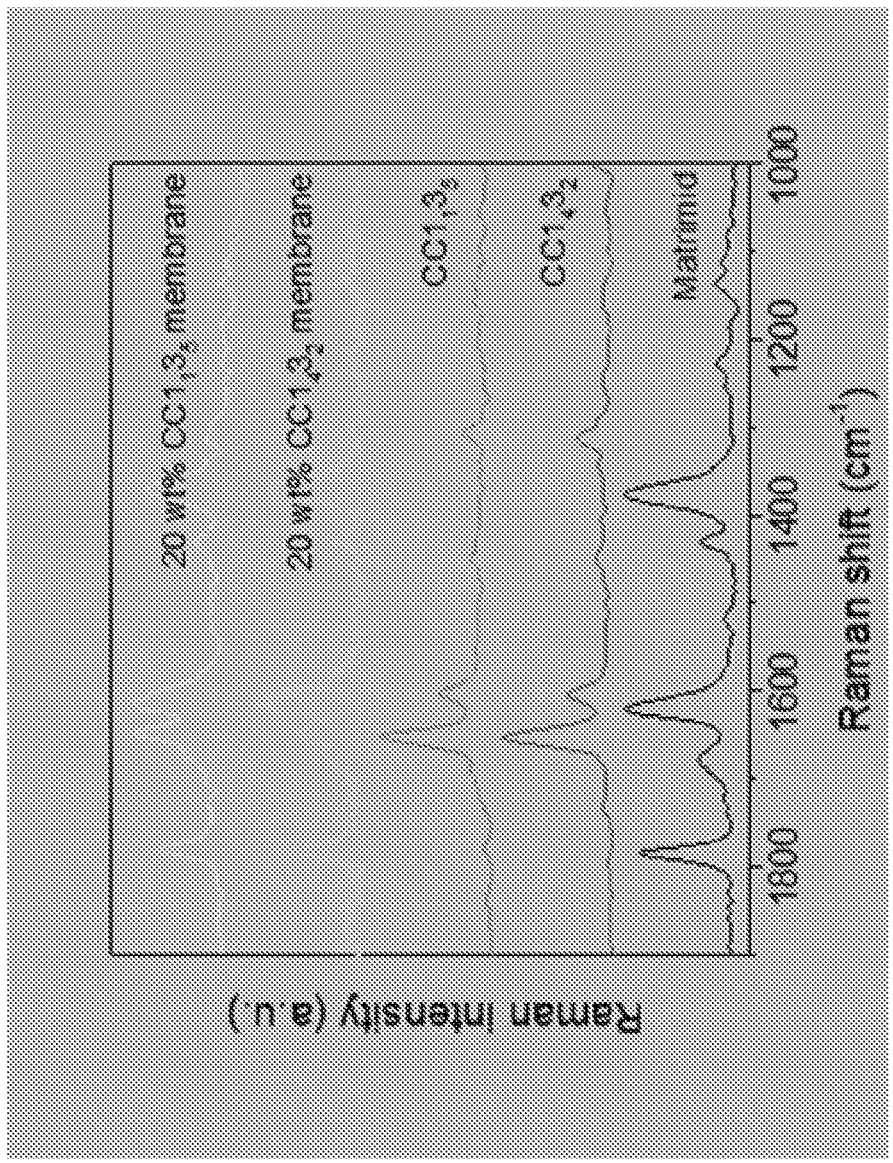
FIG. 9 illustrates the Raman shifts of some embodiments of the present disclosure.

Referring now to the Figures, FIGS. 6 and 7 illustrate exemplary embodiments of the presently disclosed method.

In FIG. 6, a method for making a molecularly-mixed composite membrane is disclosed herein. In block 610, a dope solution can be provided comprising at least a polymer, an ASPOC material, and a first solvent. In block 620, the dope solution can be mixed. In some embodiments, the dope solution can be mixed using sonication. Other methods of mixing are contemplated, such as agitation, magnetic stir bars, rollers, and the like. In some embodiments, the solubility of the ASPOC material can provide for a mild mixing process in order to form a homogeneous dope solution. In block 630, the mixed dope solution can be cast into the form of a membrane. In some embodiments, the dope can be deposited on a porous support, such as a porous polyimide support. Other suitable supports can be used, such as metal organic frameworks, zeolites, carbon molecular sieves, and the like. In some embodiments, the dope can be deposited and cast into a membrane with no porous support. In some embodiments, the dope can be cast into a membrane using a spin-coating technique. In some embodiments, the membrane can be cast in a receptacle such as a petri dish.

FIG. 7 also shows an exemplary embodiment for making a molecularly-mixed composite membrane. In block 710, a second solution can be provided comprising at least an aldehyde material, at least one diamine material, and a second solvent. In block 720, the solution can be mixed. In some embodiments, the dope solution can be mixed being placed on a roller. Other methods of mixing are contemplated, such as agitation, magnetic stir bars, sonication, and the like. In block 730, at least a portion of the second solvent can be evaporated. In some embodiments, the evaporating can comprise allowing a volatile solvent to evaporate. Other methods of evaporating can be used, such as annealing, vacuum annealing, heating, vacuum drying, and the like. In some embodiments, the solution can be washed with a nonsolvent to remove the solvent. In some embodiments, the resulting product can be used as the ASPOC material. In block 740, a dope solution can be provided comprising at least a polymer, an ASPOC material, and a first solvent. In block 750, the dope solution can be mixed. In some embodiments, the dope solution can be mixed using sonication. Other methods of mixing are contemplated, such as agitation, magnetic stir bars, rollers, and the like. In block 760, the mixed dope solution can be cast into the form of a membrane. In some embodiments, the dope can be deposited on a porous support, such as a porous polyimide support. Other suitable supports can be used, such as metal organic frameworks, zeolites, carbon molecular sieves, and the like. In some embodiments, the dope can be deposited and cast into a membrane with no porous support. In some embodiments, the dope can be cast into a membrane using a spin-coating technique. In some embodiments, the membrane can be cast in a receptacle such as a petri dish.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

EXAMPLES

The following examples are provided by way of illustration but not by way of limitation.

Example 1

Materials and Methods

Triformylbenzene was purchased from Manchester Organics. Anhydrous dichloromethane, chloroform, ethylenediamine, (1R,2R)-1,2-cyclohexanediamine, branched polyethylenimine (PEI) (Mw ~800), poly(styrene) (Mw ~200,000 by GPC) were purchased from Sigma Aldrich. Ethyl acetate and diethyl ether were purchased from BDH Chemicals. Formic acid, 38% formaldehyde solution, potassium hydroxide pellets and magnesium sulfate were purchased from Alfa Aesar. P-xylylenediamine was purchased from TCI America. Ultra-high purity N2 and CO2 gas cylinders were purchased from Airgas. Certified standard grade cylinders of 200 ppm SO2 with a balancing of N2 were purchased from Matheson Trigas. All chemicals were used as received without any purification.

The synthesis of the ASPOC CC1x3y was carried out following a modified procedure from the literature, in accordance with Jiang et al. (Jiang, S., Jones, J. T. A., Hassell, T., Blythe, C. E., Adams, D. J., Trewin, A., Cooper, A. I., *Nat. Commun.* 2011, 2, 207). The subscripts denote the starting composition of the synthesis solution—x equivalents of ethylenediamine (the linker for CC1) and y equivalents of (1R,2R)-1,2-cyclohexanediamine (the linker for CC3-R). To a solution of 500 mg triformylbenzene in 40 mL anhydrous dichloromethane (DCM), a solution of 45·x mg ethylenediamine and 87.5·y mg (1R,2R)-1,2-cyclohexanediamine in 40 mL anhydrous DCM was added. Then the mixture was stirred at room temperature for three days. A pale white powder was obtained by rotary evaporation. The product was washed with ethyl acetate to remove unreacted molecules and dried at 80° C. under vacuum.

Example 2

Methods

The membrane preparation is simplified compared to normal mixed matrix membrane formation as a result of the solubility of the ASPOC molecules. In this example, chloroform was chosen as it can dissolve both the ASPOC molecules and the polymers (Matrimid® and poly(styrene)) and resulted in a good-quality membrane. In general, the desired amounts of ASPOC and polymer were dissolved in 5 mL anhydrous chloroform. The solutions were passed through a 200 nm syringe filter to remove any insoluble impurities and then poured into PTFE Petri dishes (Dynalon®) in a glove bag pre-saturated with chloroform. After 8 to 12 hours, the Petri dishes were taken out from the glove bag, and the membranes were observed to exfoliate from the plate spontaneously. The membranes were dried at 80° C. under vacuum (29 in·Hg) to remove residual solvent and for Matrimid® membranes annealed at 200° C. under vacuum.

Example 3

Methods

A set of CC3-R mixed-matrix membranes were prepared as control experiments for the ASPOC-based membranes. CC3-R was synthesized by using the ASPOC synthesis procedure (Example 1) but with only (1R,2R)-1,2-cyclohexanediamine linker. The polymer solution was prepared by dissolving 10 mg CC3-R crystals and 90 mg Matrimid® in 5 mL anhydrous chloroform. The solution was then poured into PTFE Petri dishes (Dynalon®) in a glove bag pre-saturated overnight with chloroform. After 8 to 12 hours, the Petri dishes were taken out from the glove bag. The Matrimid membranes were dried at 80° C. under vacuum (29 in·Hg) to remove residual solvent and annealed at 200° C. under vacuum.

Example 4

Methods

The porous polyimide support for the membrane was cast prior to casting the membrane. The dope for the porous support used in thin film composites was made with the following composition by weight ratio: Matrimid®:Lithium nitrate:NMP:THF:Ethanol:DI H2O=16:1:69:10:3:1. The dope was mixed on a roller overnight. It was then cast on a glass plate with a doctor blade and allowed to dry in the open air for one day. Coupons were cut out from the film with a 5.08 cm diameter press and crosslinked in a 5% w/v solution of p-xylylenediamine in methanol (e.g., 5 g/100 mL) for one day. The coupons were then washed by submerging in fresh methanol for one day and stored in fresh methanol until use.

To fabricate the membrane, Matrimid® and the ASPOC were dried overnight at 100° C. under vacuum. Initially, 90 mg Matrimid® and 10 mg ASPOC were dissolved in 9.9 g anhydrous chloroform. Supports were removed from methanol and the excess solvent was gently dabbed off the surface with a KimWipe. The composite was spun-coat by dropping 0.5 mL of the dope onto the support while spinning at 120 rpm for 20 seconds. The spin rate was then increased to 2000 rpm for 20 minutes. The spin-coating procedure was repeated once, and the composites were dried overnight at 70° C. under vacuum.

Example 5

Characterization Methods

Gas permeation performance of the membranes was evaluated on a constant-volume/variable-pressure single gas permeation system. The annealed membranes were cut into disks with 3.81 cm diameter and mounted on the sample cell with aluminum tape with 5.08 cm diameter and a 2.54 cm diameter hole in the center. The inner edge was sealed with epoxy (DP100 Plus from McMaster). After the epoxy was cured, the cell was closed with a torque of 45 pound-ft. Membrane upstream, downstream, and gas reservoirs were evacuated overnight with an Edwards vacuum pump to less than 0.05 Torr. After evacuation, the upstream and gas reservoir were isolated by closing the gas dosing valve. The gas reservoir was charged to the desired pressure with pure gas and allowed for thermal equilibration for 10 min. The gas dosing valve was then opened, and the downstream pressure was logged with a LabVIEW program. The system leak rate was measured using a closed dosing valve and evacuated downstream for each membrane and was found to be <2% of the gas fluxes measured (except a rate of <40% for SF6).

The permeability of the membrane is calculated according to the following equation:

$$P_i = \frac{(flux)_i \cdot \ell}{\Delta P} = \left[10^{-10} \cdot \frac{cm^3(STP) \cdot cm}{cm^2 \cdot s \cdot cm\, Hg}\right]$$

Membrane area A was calculated with ImageJ® on optical images of the membranes. Membrane thicknesses $\ell$ were measured with a Peacock dial thickness gauge for 10 times.

The ideal selectivity of two gases i and j was calculated as the ratio of the permeabilities of the gases.

$$S_{i/j} = \frac{P_i}{P_j}$$

Raman mapping of Matrimid® membranes was conducted on a Thermo Nicolet Almega XR Dispersive Raman Spectrometer equipped with an optical microscope. A 488 nm laser was used as the incident. Raman spectra were taken over a membrane area of 100×100 μm with a resolution of 5 μm. The Matrimid® has a characteristic shift at 1650 cm$^{-1}$. And ASPOC molecules has various characteristic shifts at 1785 cm$^{-1}$, 1678 cm$^{-1}$, 1621 cm$^{-1}$, and 1378 cm$^{-1}$. The relative intensity (all spectra normalized to Matrimid® peak at 1650 cm$^{-1}$) of 1678 cm$^{-1}$ was overlayed on the optical image of the membrane surface.

High-resolution imaging of the composite morphology was achieved using a Hitachi SU8230 Cold Field Emission Scanning Electron Microscope (CFE-SEM). The dry samples were attached to aluminum stubs using copper tape. The samples were then coated with a 20 nm layer of gold/palladium using a Hummer 6 Gold/Palladium Sputterer. Imaging was taken at a working distance of 8 mm and a working voltage of 3 kV using a mix of upper and lower secondary electron detectors.

Carbon and nitrogen elemental mapping of polystyrene membranes was conducted on a Hitachi SU8230 cold field emission (FE)-SEM equipped with an Oxford Instruments 80 mm$^2$ X-Max energy dispersive X-ray (EDX) detector. The flat membranes were attached to aluminum stubs using copper tape. The samples were then coated with carbon using a Quorum Q-150T ES gold/carbon coater.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A molecularly-mixed composite membrane (MMCM) comprising:
    a solution comprising:
        a porous molecular material comprising porous organic cages (POCs); and
        a polymer;
        wherein the porous molecular material is dissolved in the polymer; and
        wherein the porous molecular material is so uniformly distributed in the polymer as to form the solution as if it were a single-phase solution; and
    wherein the MMCM is substantially defect-free, presenting:
        a high level of homogeneity indicative of single POCs surrounded by the polymer; and
        an attendant low degree of crystallinity or particle aggregation indicative of negligible POC-POC bonding.

2. The membrane of claim 1, wherein the porous molecular material comprises an amorphous scrambled porous organic cage ASPOC material with the stronger polymer-cage interactions than cage-cage interactions.

3. The membrane of claim 1, wherein a glass transition onset temperature of the membrane is greater than a glass transition onset temperature of the polymer.

4. The membrane of claim 1, wherein a glass transition midpoint temperature of the membrane is greater than a glass transition midpoint temperature of the polymer.

5. The membrane of claim 1, wherein a swelling volume of the membrane is less than a swelling volume of the polymer.

6. The membrane of claim 1, wherein one or more of:
    a glass transition onset temperature of the membrane is greater than a glass transition onset temperature of the polymer;
    a glass transition midpoint temperature of the membrane is greater than a glass transition midpoint temperature of the polymer; or
    a swelling volume of the membrane is less than a swelling volume of the polymer.

7. The membrane of claim 6, wherein at least one of:
    the membrane presents a carbon dioxide permeability of 20 barrer or greater; or
    the membrane presents a diffusion coefficient greater than a diffusion coefficient of the polymer.

8. The membrane of claim 1, wherein the membrane presents a methane permeability of 0.75 barrer or greater.

9. The membrane of claim 1, wherein the membrane presents a nitrogen permeability of 1 barrer or greater.

10. The membrane of claim 1, wherein the membrane presents a SF6 permeability of 0.01 barrer or greater.

11. A method of making the membrane of claim 1 comprising:
mixing a dope solution comprising:
the polymer;
the porous molecular material; and
a first solvent configured to dissolve the polymer and the porous molecular material to form the dope solution; and
casting the mixed dope solution;
wherein at least one of:
a glass transition onset temperature of the casted mixed dope solution is greater than a glass transition onset temperature of the polymer;
a glass transition midpoint temperature of the casted mixed dope solution is greater than a glass transition midpoint temperature of the polymer; or
a swelling volume of the casted mixed dope solution is less than a swelling volume of the polymer.

12. The method of claim 11, wherein mixing comprises sonication.

13. The method of claim 12, wherein the sonication occurs for 1 minute or less.

14. The method of claim 11, wherein casting comprises spin-coating the solution on pre-formed crosslinked polyimide supports.

15. The method of claim 11, wherein casting comprises casting the membrane as a standalone membrane.

16. The method of claim 11 further comprising annealing the casted mixed dope solution under vacuum.

17. The method of claim 11, wherein the mixed dope solution is homogeneous.

18. The method of claim 11 further comprising synthesizing the porous molecular material.

19. The method of claim 18, wherein synthesizing comprises:
mixing a second solution comprising:
an aldehyde material;
at least one diamine material; and
a second solvent; and
evaporating at least a portion of the second solvent.

20. The method of claim 19 further comprising drying the porous molecular material.

21. The method of claim 19 further comprising washing the porous molecular material with a nonsolvent.

22. The method of claim 11 further comprising evaporating at least a portion of the first solvent.

23. The method of claim 11, wherein one or more of:
the mixed dope solution presents a diffusion coefficient greater than a diffusion coefficient of the polymer;
the mixed dope solution presents a methane permeability of 0.75 barrer or greater;
the mixed dope solution presents a nitrogen permeability of 1 barrer or greater; or
the mixed dope solution presents a $SF_6$ permeability of 0.01 barrer or greater.

* * * * *